(12) United States Patent
Gao (10) Patent No.: US 10,412,307 B2
(45) Date of Patent: Sep. 10, 2019

(54) ELECTRONIC DEVICE AND IMAGE DISPLAY METHOD

(71) Applicant: Lenovo (Beijing) Limited, Beijing (CN)

(72) Inventor: Cheng Guo Gao, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 115 days.

(21) Appl. No.: 14/826,033

(22) Filed: Aug. 13, 2015

(65) Prior Publication Data

US 2016/0301876 A1 Oct. 13, 2016

(30) Foreign Application Priority Data

Apr. 7, 2015 (CN) .......................... 2015 1 0162249

(51) Int. Cl.
*H04N 5/232* (2006.01)
*G06T 5/00* (2006.01)
*G06K 9/00* (2006.01)
*G06K 9/38* (2006.01)

(52) U.S. Cl.
CPC ..... *H04N 5/23293* (2013.01); *G06K 9/00228* (2013.01); *G06K 9/00456* (2013.01); *G06K 9/38* (2013.01); *G06T 5/00* (2013.01); *G06K 2209/01* (2013.01)

(58) Field of Classification Search
CPC .. H04N 5/23293; H04N 5/23219; G06T 5/00; G06K 2209/01; G06K 9/46; G06K 9/00228; G06K 9/00456; G06K 9/38
See application file for complete search history.

(56) References Cited

U.S. PATENT DOCUMENTS

| 6,226,510 | B1* | 5/2001 | Boling | H04W 4/90 455/404.2 |
| 2002/0052193 | A1* | 5/2002 | Chetty | G06F 21/35 455/412.1 |
| 2010/0007769 | A1* | 1/2010 | Chiang | H04N 5/23219 348/231.99 |
| 2010/0283859 | A1* | 11/2010 | Shimma | G06F 3/0482 348/207.1 |
| 2012/0236173 | A1* | 9/2012 | Telek | G03B 17/08 348/223.1 |
| 2012/0274825 | A1* | 11/2012 | Oogami | H04N 5/23293 348/333.01 |
| 2013/0076936 | A1* | 3/2013 | Yoshida | H04N 5/23293 348/222.1 |
| 2013/0135511 | A1* | 5/2013 | Yamada | H04N 5/23219 348/333.12 |
| 2013/0329023 | A1* | 12/2013 | Suplee, III | G06K 9/2081 348/61 |
| 2014/0062962 | A1* | 3/2014 | Jang | G06F 17/21 345/175 |
| 2014/0168468 | A1* | 6/2014 | Levoy | H04N 5/2353 348/229.1 |

(Continued)

*Primary Examiner* — Luong T Nguyen
(74) *Attorney, Agent, or Firm* — Kunzler Bean & Adamson (57) ABSTRACT

For image display, an imaging device captures an image. A display unit displays the captured image. A processing unit displays a second interface in response to the image satisfying a predetermined condition, wherein the second interface comprises controls corresponding to the predetermined condition.

15 Claims, 7 Drawing Sheets

(56) References Cited

U.S. PATENT DOCUMENTS

2014/0330684 A1* 11/2014 Mizui .................... G06Q 30/02
 705/27.2
2014/0362274 A1* 12/2014 Christie ................ G06F 3/0488
 348/333.11
2015/0033129 A1* 1/2015 Cho ....................... G06F 3/0488
 715/728

* cited by examiner

ELECTRONIC DEVICE AND IMAGE DISPLAY METHOD

CROSS-REFERENCE TO RELATED APPLICATIONS

This patent application claims priority to People's Republic of China Patent Application No. 201510162249.7 filed on Apr. 7, 2015 for Cheng Guo GAO, the entire contents of which are incorporated herein by reference for all purposes.

FIELD

Disclosed herein are an electronic device and an image display method capable of carrying out intelligent adjustment for an imaging device according to changes of captured image contents and surrounding scenes.

BACKGROUND

Description of the Related Art

At present, control settings of an imaging device of a mobile electronic device are generally fixed, for example, virtual keys such as an image capture key, a flash lamp key and a playback key included in the imaging device are disposed at fixed positions on the imaging device and occupy an area in a display interface, thereby being not conducive to the personalized operation of users, and also not favorable for the neatness and attractiveness to capture images. In some mobile electronic devices, the imaging device can be adjusted by a user. For example, the user can select some functions from a menu by means of a drop-down menu, such as panoramic exposure and a scene mode, so as to adjust the imaging device.

BRIEF DESCRIPTION OF THE DRAWINGS

The above and other advantages and features of the embodiments will be more comprehensively understood in conjunction with the accompanying drawings, in which.

DETAILED DESCRIPTION

Although an imaging device of an electronic device can be adjusted by setting the drop-down menu, etc., the selection of these functions in the menu often requires repeated clicking or sliding operation, and thus the user experience is affected. Moreover, the adjustment of the imaging device in this way is still very limited, and usually confined to functions manually selected by users or default functions provided by the electronic device, in other words, the intelligent degree of the imaging device of the electronic device is not high, especially the intelligent adjustment cannot be carried out according to the changes to image contents and surrounding scenes.

In order to solve the above technical problems, provided herein is an electronic device capable of carrying out intelligent adjustment for an imaging device according to changes of image contents, surrounding scenes and an image display method.

According to one aspect, the embodiments herein provide an electronic device, comprising: a capture unit, configured to carry out image capture at a predetermined time interval to generate a first display image; a display unit, configured to initially display a first interface, and display the first interface and the first display image simultaneously; and a processing unit, configured to detect the first display image, switch the first interface to a second interface corresponding to predetermined conditions if the first display image meets the predetermined conditions and display the second interface through the display unit, wherein the second interface is different from the first interface.

According to another aspect, the embodiments herein provide an image display method applied to an electronic device, wherein the electronic device has a display unit, and the image display method comprises: a capture step for carrying out image capture at a predetermined time interval to generate a first display image; a display step for initially displaying a first interface, and displaying the first interface and the first display image simultaneously; and a processing step for detecting the first display image, switching the first interface to a second interface corresponding to predetermined conditions if the first display image meets the predetermined conditions and displaying the second interface through the display unit, wherein the second interface is different from the first interface.

As can be seen, according to the electronic device and the image display method in the embodiments, by detecting the captured first display image, and automatically switching from the first interface to displaying the second interface corresponding to the predetermined conditions if the first display image meets the predetermined conditions, the intelligent adjustment for the imaging device according to the captured image contents and surrounding scenes is achieved, and the neatness and attractiveness of the imaging device of the electronic device can be ensured, meanwhile, the manual setting for the imaging device by the user is reduced, and the user experience is effectively improved.

The embodiments will be described in detail with reference to the accompanying drawings hereinafter. In the description and the accompanying drawings, the same or similar reference numerals will be used to indicate substantially identical elements and functions, and the duplicate description of these elements and functions will be omitted. In addition, for the sake of clarity and simplicity, the description of well-known functions and constructions in the art can be omitted.

The embodiments will be described in detail with reference to the accompanying drawings hereinafter.

Figure 1:
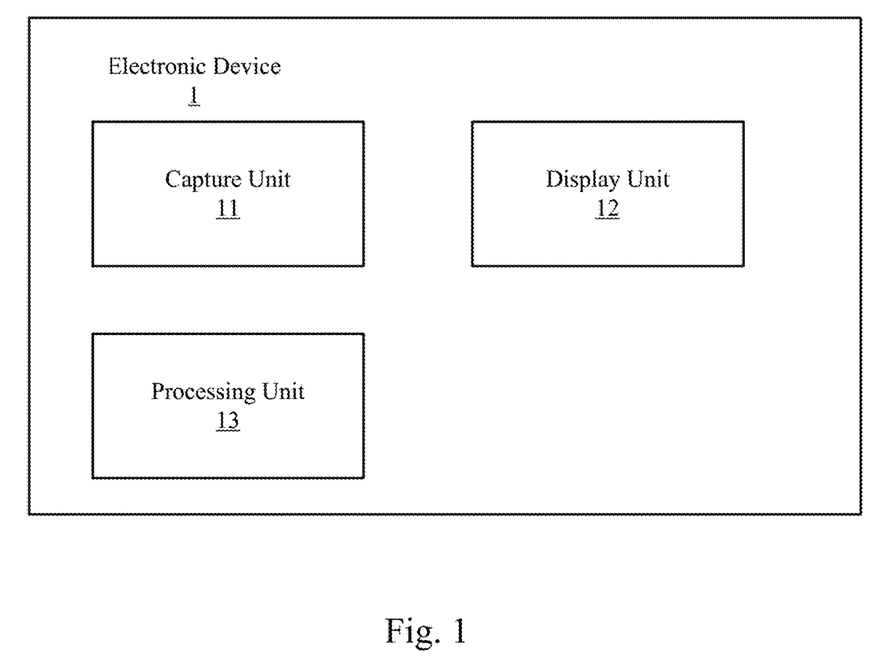
FIG. 1 is a diagram illustrating on embodiment of a hardware configuration of an electronic device.

FIG. 1 is a diagram illustrating one embodiment of a configuration of an electronic device 1. The electronic device 1 according to one embodiment may be an electronic device such as a desktop computer, a tablet computer, a smart phone, a personal digital assistant and an intelligent wearable device with an image capture device. In the following, in order to facilitate description, the smart phone will be taken as an example of the electronic device.

As shown in FIG. 1, the electronic device 1 comprises a capture unit 11, a display unit 12 and a processing unit 13. The capture unit 11 is configured to carry out image capture at a predetermined time interval to generate a first display image. The capture unit 11 may be a vidicon, a camera, a camera lens and the like.

The display unit 12 is configured to initially display a first interface, and display the first interface and the first display image simultaneously. The display unit 12 may be a plasma display, an organic electroluminescent display, a liquid crystal display, etc. However, the embodiments are not limited to these examples, and those skilled in the art can select the type of the display unit according to actual needs. The first interface may be a default imaging device when the electronic device 1 activates an image capture function. Preferably, the default imaging device includes functional assemblies such as an image capture key, a playback key, a flash lamp key and a drop-down menu. However, the embodiments are not limited to these examples, and the types and positions of the functional assemblies included in the first interface can also be preset by users. The first display image may cover completely the first interface, and in this case, the functional assemblies included in the first interface are disposed to be overlapped with the first display image, and displayed above the first display image. In addition, the first display image may also only occupy a part of the first interface, and in this case, the functional assemblies included in the first interface may be disposed to be overlapped with the first display image and displayed above the first display image, and may also be disposed outside the first display image.

The processing unit 13 is configured to detect the first display image, switch the first interface to a second interface if the first display image meets the predetermined conditions and display the second interface through the display unit, wherein the second interface is different from the first interface. The processing unit 13 is a processor such as a CPU.

The predetermined conditions may be preset during delivery of the electronic device 1, and may also be selected by users according to actual needs. The predetermined condition may be indicative of a potential enhancement to the image and may, for example, include: subjects such as people appearing in the first display image or occupies a relatively large area; alphanumeric characters and/or logograms, referred to hereafter as alphanumeric characters, appearing in the first display image or a combination of letters and/or numbers appears in the first display image; and the first display image is too bright by exceeding a brightness level and/or too dark by exceeding a darkness level. The first display image being too bright or too dark refers to a brightness value of pixels in a particular area of the display unit 12 adjusted by the electronic device 1 based on image data captured and generated by the image capture unit 11, rather than the magnitude of a brightness value of the display unit 12 itself, and the brightness value reflects the brightness of surrounding scenes of captured image contents. In addition, the brightness of surrounding scenes of the electronic device 1 can also be detected by a brightness sensor. In this case, the electronic device 1 also comprises the brightness sensor. If the brightness sensor detects that the brightness of the surrounding scenes is relatively low, the processing unit 13 may be provided with a flash lamp key, a High Dynamic Range (HDR) function key, etc. on the second interface.

Although the predetermined conditions are listed above in the form of examples, the embodiments are not limited to these examples, and the predetermined conditions may also be: the first display image is an image showing landscapes such as mountains and rivers; the definition of the first display image is less than a predetermined threshold; and the composition of the first display image meets a predetermined composition scheme, etc. In addition, the predetermined conditions are not a single restrictive condition, namely, they may be a combination of the above multiple exemplary predetermined conditions, for example, one or more subjects appearing in the first display image, and the first display image is too dark simultaneously.

The second interface corresponds to the predetermined conditions. That is, the second interface varies as the predetermined conditions met by the first display image are changed. The corresponding relationship between the second interface and the predetermined conditions can be preset during delivery of the electronic device 1, and can also be selected by users according to actual needs.

The corresponding relationship between the second interface and the predetermined conditions, for example, may be: if a subject appears in the first display image, a facial beautification function key appears on the second interface for a user to select and activate the function and/or an image processed by a facial beautification function is directly displayed on the second interface; if alphanumeric characters such as a combination of text and/or numbers appears in the first display image, prompt information appears on the second interface to ask the user whether to save the text and the numbers in a contact database address book, and/or the address book is directly displayed on the second interface with the alphanumeric characters entered in the address book; and if the first display image is too bright or too dark, an HDR function key and/or HDR image appears on the second interface for the user to select. In one embodiment, the HDR function key initiates continuously imaging multiple photos and combining the photos, so as to improve too bright or too dark parts in the photos, and obtain a more equalized exposure effect. The function key prompt information appearing on the second interface may be one or more of text prompt information, a vibration prompt, a voice prompt, and the like. Accordingly, differences exist in the response of users to the prompt information. The users can select such keys as "yes" or "no", and can also make response by shaking the phone or via voice input.

Although the corresponding relationship between the predetermined conditions and the second interface is listed above in the form of examples, the embodiments are not limited to these examples, the predetermined conditions met by the first display image vary as the first display image is changed, and thus the second interface corresponding to the predetermined conditions is also different, so that the neatness and attractiveness of the interface of the display unit 12 can be achieved, and the manual operation steps of the users can be reduced simultaneously only by carrying out intelligent adjustment for the second interface based on the predetermined conditions met by the first display image. In addition, as the predetermined conditions may be a combination of the above multiple exemplary predetermined conditions, multiple contents can be adjusted when the first interface is switched to the second interface. For example, if a portrait appears in the first display image, and the first display image is too dark simultaneously, an image processed by a facial beautification function can be displayed on the second interface, and an HDR function key appears on the second interface simultaneously for the user to select and activate the function for image capture.

As can be seen, by detecting the captured first display image, and automatically switching the first interface to the second interface corresponding to predetermined conditions if the first display image meets the predetermined conditions, the electronic device 1, in one embodiment, achieves intelligent adjustment for an imaging device according to the captured image contents and surrounding scenes, and can ensure the neatness and attractiveness of the imaging device of the electronic device while the manual setting for the imaging device by the user is reduced, and the user experience is effectively improved.

Figure 2:
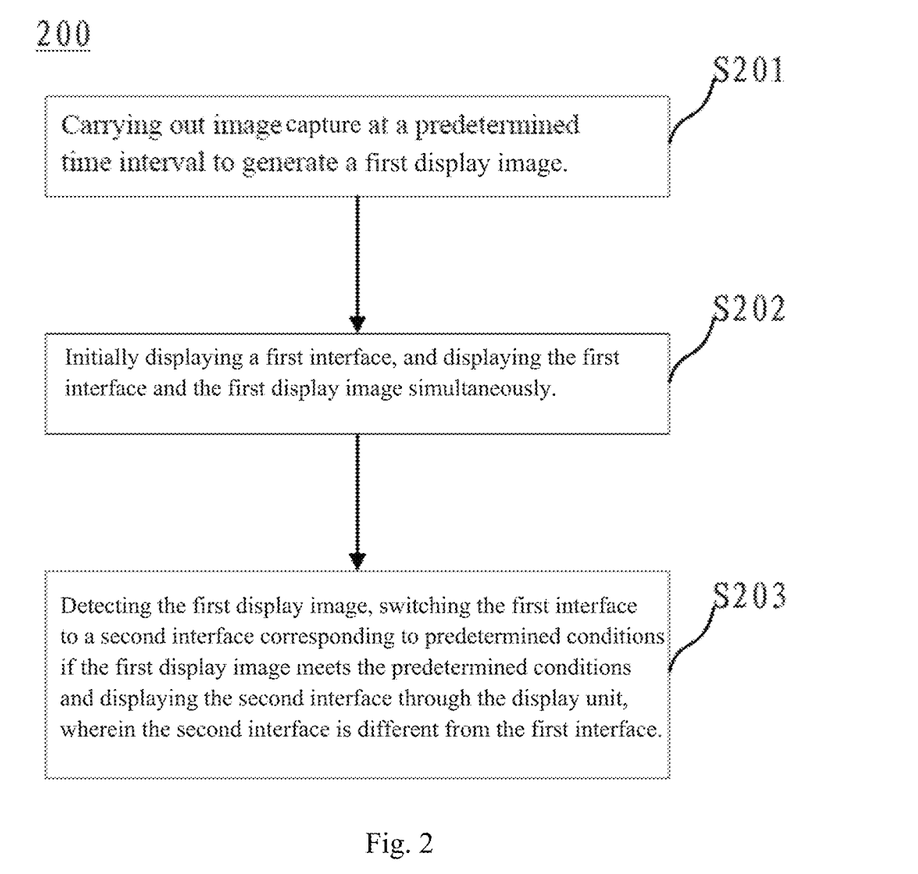
FIG. 2 is a flow chart illustrating one embodiment of an image display method.

An image display method according to the embodiments will be described with reference to FIG. 2 hereinafter. FIG. 2 is a flow chart illustrating one embodiment of the image display method 200. The image display method 200 will be described herein in conjunction with various assemblies of the electronic device 1 shown in FIG. 1; therefore the detailed description of the various assemblies will be omitted. Meanwhile, for ease of description, the electronic device 1 will still be taken as an example of the electronic device for description herein.

As shown in FIG. 2, in step S201, image capture is carried out at a predetermined time interval to generate a first display image. Specifically, the image capture is carried out by an image capture unit 11 at the predetermined time interval to generate the first display image.

In step S202, a first interface is initially displayed, and the first interface and the first display image are displayed simultaneously.

Specifically, the first interface is initially displayed by a display unit 12, and the first interface and the first display image captured and generated by the image capture unit 11 are displayed simultaneously. The first interface may be a default imaging interface when the electronic device 1 activates an image capture function. Preferably, the default imaging device includes functional assemblies such as an image capture key, a playback key, a flash lamp key and a drop-down menu. However, the embodiments are not limited to these examples, and the types and positions of the functional assemblies included in the first interface can also be preset by users. The first display image cover completely the first interface, and in this case, the functional assemblies included in the first interface are disposed to be overlapped with the first display image, and displayed above the first display image. In addition, the first display image may also only occupy a part of the first interface, and in this case, the functional assemblies included in the first interface may be disposed to be overlapped with the first display image and displayed above the first display image, and may also be disposed outside the first display image.

In step S203, the first display image is detected, and the first interface is switched to a second interface corresponding to predetermined conditions if the first display image meets the predetermined conditions and the second interface is displayed through the display unit 12, wherein the second interface is different from the first interface.

Specifically, the first display image is detected by a processing unit 13. The predetermined conditions can be preset during delivery of the electronic device 1, and can also be selected by users according to actual needs. The predetermined conditions, for example, may be: one or more subjects appear in the first display image or occupy a relatively large area; alphanumeric characters such as a combination of text and numbers appears in the first display image or a combination of letters and numbers appears in the first display image; and the first display image is too bright or too dark. It is worth mentioning that the first display image being too bright or too dark refers to a brightness value of pixels in a particular area of the display unit 12 adjusted by the electronic device 1 based on image data captured and generated by the image capture unit 11, rather than the magnitude of a brightness value of the display unit 12 itself, and the brightness value reflects the brightness of surrounding scenes of captured image contents. Although the predetermined conditions are listed above in the form of examples, the embodiments are not limited to these examples, and the predetermined conditions may also be: the first display image is an image showing landscapes such as mountains and rivers; the definition of the first display image is less than a predetermined threshold; and the composition of the first display image meets a predetermined composition scheme, etc. In addition, the predetermined conditions are not a single restrictive condition, namely, they may be a combination of the above multiple exemplary predetermined conditions, for example, a subject appears in the first display image, and the first display image is too dark simultaneously.

The second interface corresponds to the predetermined conditions. That is, the second interface varies as the predetermined conditions met by the first display image are changed. The corresponding relationship between the second interface and the predetermined conditions can be preset during delivery of the electronic device 1, and can also be selected by users according to actual needs.

The corresponding relationship between the second interface and the predetermined conditions, for example, may be: if one or more subjects appear in the first display image, a facial beautification function key appears on the second interface for a user to select and activate the function, or an image processed by a facial beautification function is directly displayed on the second interface; if an alphanumeric character appears in the first display image, prompt information appears on the second interface to ask the user whether to save the text and the numbers in an address book, or the address book is directly displayed on the second interface and the alphanumeric characters have been saved in the address book; and if the first display image is too bright or too dark, an HDR functional key appears on the second interface for the user to select and activate the HDR function for image capture. It is worth mentioning that the prompt information appearing on the second interface may be either text prompt information or vibration prompt, voice prompt and the like. Accordingly, difference exists in the response of users to the prompt information: the users can select such keys as "yes" or "no", and can also make response by shaking the phone or via voice input.

Although the corresponding relationship between the predetermined conditions and the second interface is listed above in the form of examples, the embodiments are not limited to these examples, the predetermined conditions met by the first display image vary as the first display image is changed, and thus the second interface corresponding to the predetermined conditions is also different, so that the neatness and attractiveness of the interface of the display unit 12 can be achieved, and the manual operation steps of the users can be reduced simultaneously only by carrying out intelligent adjustment for the second interface based on the predetermined conditions met by the first display image. In addition, as the predetermined conditions may be a combination of the above multiple exemplary predetermined conditions, multiple contents can be adjusted when the first interface is switched to the second interface. For example, if a subject appears in the first display image, and the first display image is too dark simultaneously, an image processed by a facial beautification function can be displayed on the second interface, and an HDR function key appears on the second interface simultaneously for the user to select and activate the function for image capture.

As can be seen, by detecting the captured first display image, and automatically displaying the first interface to the second interface corresponding to predetermined conditions if the first display image meets the predetermined conditions, the image display method 200 may achieve intelligent adjustment for an electronic device according to the captured image contents and surrounding scenes, and may ensure the neatness and attractiveness of the imaging device of the electronic device, meanwhile, the manual setting for the imaging device by the user is reduced, and the user experience is effectively improved.

Figure 3A:
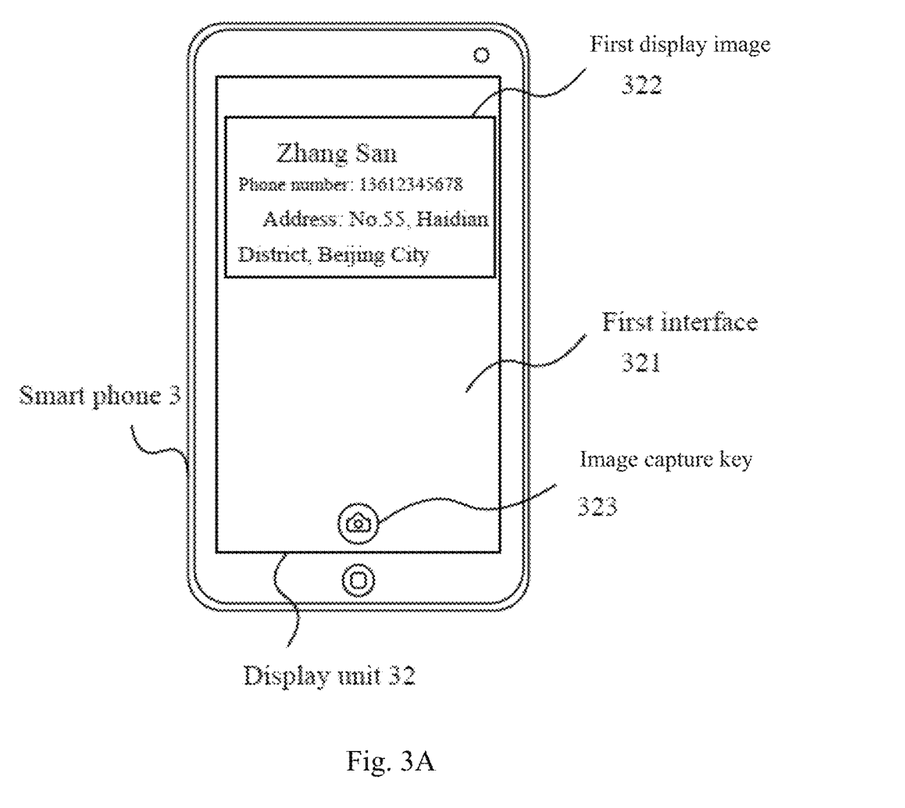
FIGS. 3A-C are schematic diagrams illustrating embodiments of image capture with the electronic device.
Figure 3B:
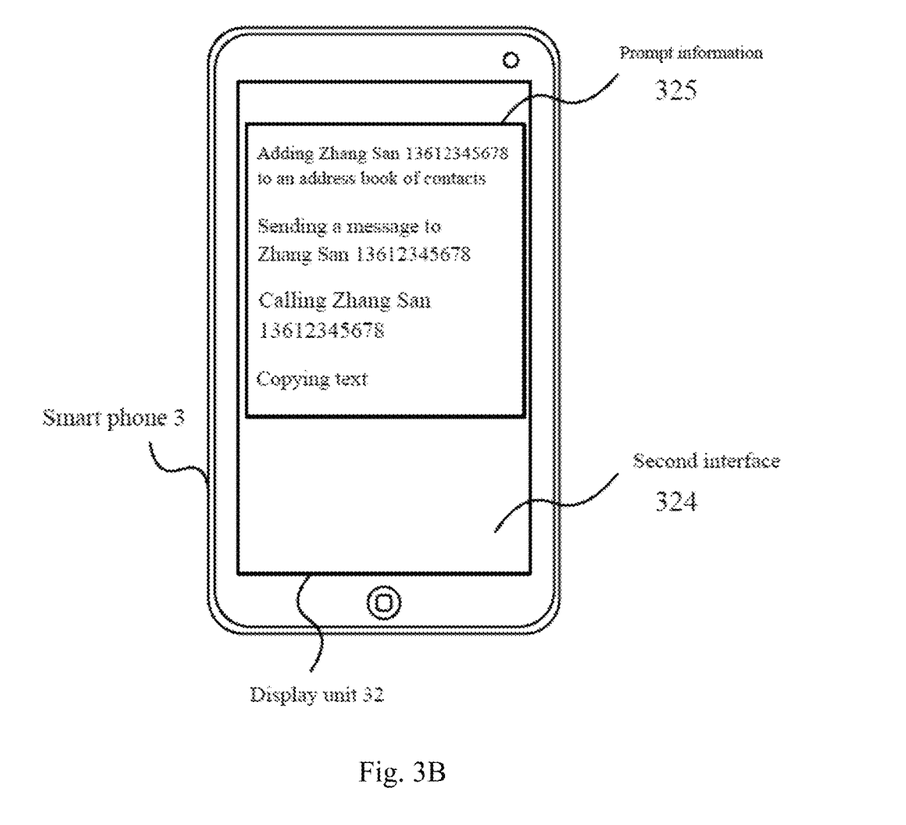
Figure 3C:
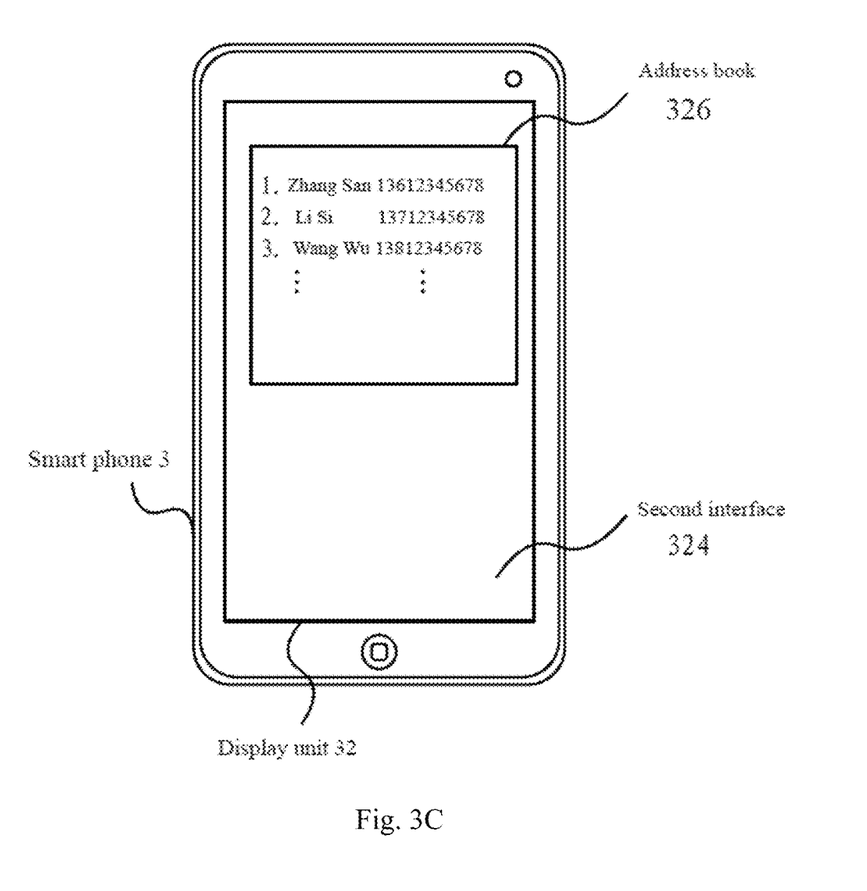

Embodiments of the image display method will be described in detail with reference to FIG. 3A to FIG. 3C and FIG. 4A and FIG. 4B hereinafter. FIG. 3A to FIG. 3C are drawings illustrating embodiments of image capture with the electronic device.

As shown in FIG. 3A, the user activates the image capture function of a smart phone 3 and captures image of a business card including the information of name "Zhang San", phone number, address, etc. A capture unit 11 (not shown) of the smart phone 3 captures this card and displays it on a display unit 32 as a first display image 322. Meanwhile, a first interface 321 is also displayed on the display unit 32. The first interface 321 is a default imaging device of the smart phone 3, that is, when the user activates the image capture function, the initial interface on the display unit 32 is the first interface 321. An image capture key 323 is disposed at the bottom of the first interface 321. The user can complete the image capture operation by pressing the image capture key 323. It should be noted that, the first interface 321 shown in FIG. 3A is merely exemplary, the first interface 321 can also include functional assemblies such as a playback key, a flash lamp key and a drop-down menu, and the user can also preset the types and positions of the functional assemblies included in the first interface.

As shown in FIG. 3B, a processing unit 13 (not shown) of the smart phone 3 detects the first display image 322, recognizes that the alphanumeric characters are included in the first display image 322, and then switches the first interface 321 to the second interface 324. The first display image 322 can be detected by the processing unit 13 with an OCR technology, so that the alphanumeric characters can be recognized. In the second interface 324, the image capture key 323 disposed in the first interface 321 is removed, and prompt information 325 is displayed. The prompt information 325 is divided into the following four parts: "adding Zhang San 13612345678 to the address book", "sending a message to Zhang San 13612345678", "calling Zhang San 13612345678" and "copying text". The above four parts correspond to four functions of the smart phone 3 respectively, namely, adding a contact to the address book, sending a message, calling and copying text, and the above four parts all can be selected by the user by clicking with a finger. When the user selects a certain part, the smart phone 3 activates the corresponding function in response to the selecting operation of the user. It should be noted that, the prompt information 325 shown in FIG. 3B is merely exemplary, and differences may exist in the contents of the prompt information 325 and the functions corresponding to the prompt information 325 due to the variation of the smart phone 3. For example, the prompt information 325 may be voice prompt information, namely, asking the user "whether to add Zhang San 13612345678 to the address book?" with voice. Accordingly, the user can also carry out selecting operation by replying "yes" or "no" with voice.

It can be assumed that, in the case shown in FIG. 3B, the user selects the first part in the prompt information 325 through a finger touch, that is, "adding Zhang San 13612345678 to the address book". As shown in FIG. 3C, the smart phone 3 activates the function of the address book in response to the selecting operation of the user, and adds "Zhang San 13612345678" to the address book 326.

It should be noted that, although the process of prompting the user to select with the prompt information 325 is illustrated in FIG. 3B, the embodiments are not limited to such case, if the processing unit of the smart phone 3 detects the first display image 322 and recognizes the alphanumeric characters included in the first display image 322, the processing unit can directly activate the function of the address book and add "Zhang San 13612345678" to the address book 326. In other words, the process shown in FIG. 3B may be omitted.

Accordingly, the intelligent adjustment for the electronic device according to the captured image (business card) is achieved through the process shown in FIG. 3A to FIG. 3C, and the user can complete the operations of adding information to the address book, sending a message, calling, etc. without inputting card information manually or only by several clicking operations simply.

Figure 4A:
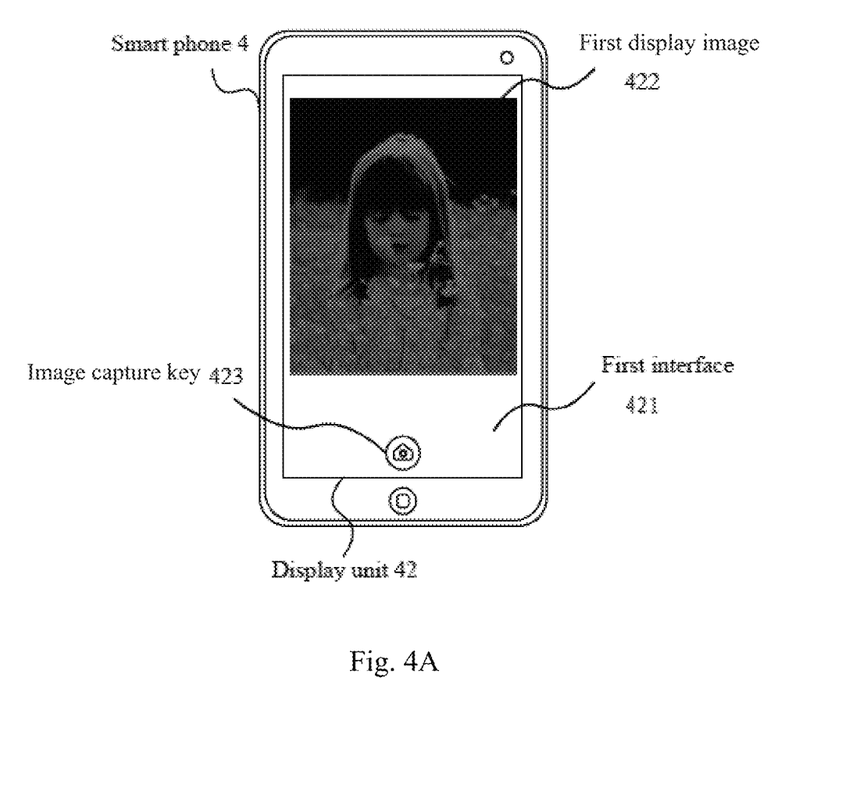
FIGS. 4A-B are another schematic diagrams illustrating embodiments image capture with the electronic device.
Figure 4B:
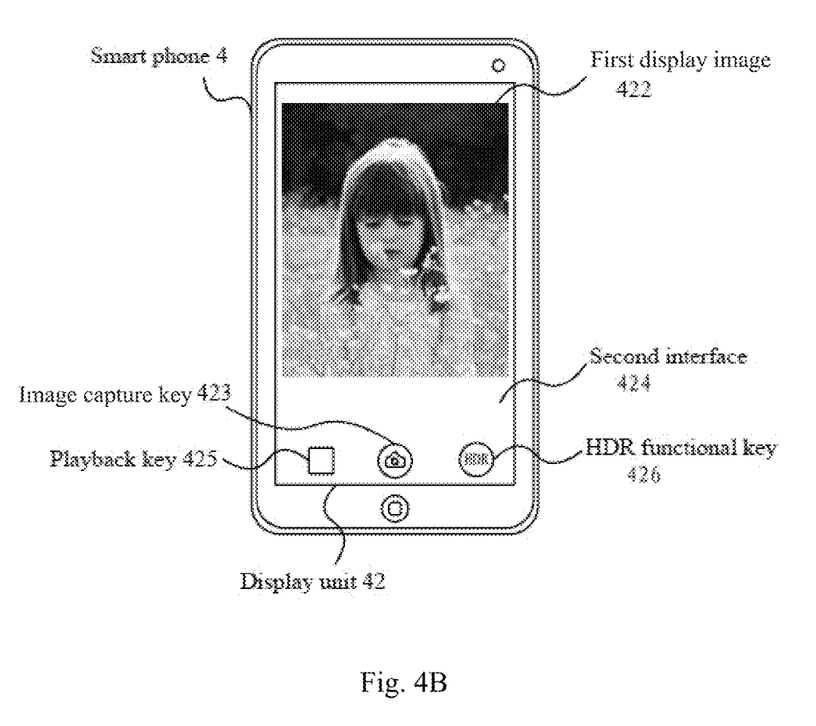

FIG. 4A and FIG. 4B are drawings illustrating embodiments of capturing an image with the electronic device. As shown in FIG. 4A, the user activates the image capture function of a smart phone 4, and a capture unit 11 (not shown) captures an image of a girl and displays it on a display unit 42 as a first display image 422. Meanwhile, a first interface 421 is also displayed on the display unit 42. The first interface 421 is a default imaging device of the smart phone 4, that is, when the user activates the image capture function, the initial interface on the display unit 42 is the first interface 421. An image capture key 423 is disposed at the bottom of the first interface 421. The user can complete the image capture operation by pressing the image capture key 423. Similar to the description above in FIG. 3A, the first interface 421 is merely exemplary, and may also include functional assemblies such as a playback key, a flash lamp key and a drop-down menu, and the user can also preset the types and positions of the functional assemblies included in the first interface.

As shown in FIG. 4B, a processing unit 13 (not shown) of the smart phone 4 detects the first display image 422, recognizes that a subject is included in the first display image 422, and then switches the first interface 421 to the second interface 424. The first display image 422 can be detected by the processing unit with a face recognition technology, so that the portrait can be recognized. The processing unit 13 may judge that the brightness of the image 422 is lower than a preset brightness level after detecting the first display image 422. In the second interface 424, in addition to an image capture key 423, a playback key 425 and an HDR functional key 426 are also disposed to prompt the user to select the playback key 425 and the HDR function key 426, and correspond to a photo playback function and an HDR function of the smart phone 4, respectively. In this manner, the user may play back the captured image by selecting the playback key 425 after completing the image capture operation by pressing the image capture key 423. Moreover, due to relatively low brightness of the first display image 422, the user can activate the HDR function by selecting the HDR functional key 426 to capture an image with a more equalized exposure effect.

Furthermore, when switching the first interface 421 to the second interface 424, the processing unit 13 of the smart phone 4 not only sets the playback key 425 and the HDR functional key 426 as prompt information, but also activates a facial beautification function and carries out dermabrasion and filter treatment for the first display image 422, and then displays the image after dermabrasion and filter treatment on the second interface 424.

Thus, the intelligent adjustment is made available for the captured image on the electronic device through the process shown in FIG. 4A and FIG. 4B, and the potentially used keys for the user such as the playback key and the HDR function key can appear without the user manually activating the keys on the electronic device, so that the manual setting for the electronic device by the user is reduced, and the user experience is effectively improved since facial beautification treatment is also automatically carried out on the captured image including the portrait.

It is to be noted that, in the description, the terms "comprising", "including" or any other variation thereof, are intended to cover a non-exclusive inclusion, such that a process, method, article or device that comprises a list of elements not only comprises those elements, but also comprises other elements which are not expressly listed or elements inherent in such process, method, article or device. An element defined by the statement of "comprising . . . " does not, without more constraints, preclude the existence of additional identical elements in the process, method, article or device that comprises the element.

Those skilled in the art would appreciate that the disclosed embodiments herein can be implemented as electronic hardware, computer software or a combination of both. To clearly illustrate the interchangeability of hardware and software, the composition and steps of each example have been described above generally in terms of their functionality. Whether such functionality is implemented as hardware or software depends upon the particular application and design constraints imposed on the technical scheme. The skilled person in the art may implement the described functionality in varying ways for each particular application, but such implementation should not be interpreted as causing a departure from the scope of the embodiments.

Additionally, embodiments may take the form of a program product embodied in one or more computer readable storage mediums storing machine readable code, computer readable code, and/or program code, referred hereafter as code. The storage devices may be tangible, non-transitory, and/or non-transmission. The storage devices do not embody mere signals, though in a certain embodiments, the storage devices only employ signals for accessing code.

What is claimed is:

1. An apparatus, comprising:
an imaging device configured to capture images;
a display unit configured to display the captured images; and
a processor coupled to the imaging device and the display unit,
wherein the processor is configured to control the display unit to display a first interface on the display unit in response to the imaging device capturing a first image and to display a second interface on the display unit in response to the first image meeting predetermined conditions, wherein the first and second interfaces are different from each other and the processor is operative to recognize a human object in the first image and recognize the first image exceeding a brightness level, and in response to recognizing the human object and the first image exceeding the brightness level, to display an enhancement function key with the second interface to adjust the brightness level of the first image.

2. The apparatus according to claim 1, wherein the second interface comprises an indication of a potential enhancement to a condition of the first image.

3. The apparatus according to claim 1, wherein the second interface further comprises the enhancement function key to affect a potential enhancement to the human object of the first image.

4. The apparatus according to claim 1, wherein the second interface comprises a prompt to save an alphanumeric characters content to an address book and the alphanumeric characters content displayed as an entry in the address book.

5. The apparatus according to claim 1, wherein the second interface comprises a High Dynamic Range (HDR) function key in response to the first image exceeding the brightness level.

6. A method, comprising:
capturing, by use of a processor, images using an imaging device; and
controlling a display unit to display a first interface on the display unit in response to the imaging device capturing a first image and to display a second interface on the display unit in response to the first image meeting predetermined conditions, wherein the first and second interfaces are different from each other;
recognizing a human object in the first images and recognize the first image exceeding a brightness level, and in response to recognizing the human object and the first image exceeding the brightness level, to display an enhancement function key with the second interface to adjust the brightness level of the first image.

7. The method according to claim 6, wherein the second interface comprises an indication of a potential enhancement to a condition of the first image.

8. The method according to claim 6, wherein the second interface further comprises the enhancement function key to affect an enhancement to the human object of the first image.

9. The method according to claim 6, wherein the second interface comprises a prompt to save an alphanumeric characters content to an address book and the alphanumeric characters content displayed as an entry in the address book.

10. The method according to claim 6, wherein the second interface comprises a High Dynamic Range (HDR) function key in response to the first image exceeding the brightness level.

11. A program product comprising a non-transitory computer readable storage medium that stores code executable by a processor, the executable code comprising executable code to perform:
capturing images using an imaging device; and
controlling a display unit to display a first interface on the display unit in response to the imaging device capturing a first image and to display a second interface on the display unit in response to the first image meeting predetermined conditions, wherein the first and second interfaces are different from each other;
recognizing a human object in the first image and recognize the first image exceeding a brightness level, and in response to recognizing the human object and the first image exceeding the brightness level, to display an enhancement function key with the second interface to adjust the brightness level of the first image.

12. The program product according to claim 11, wherein the second interface comprises an indication of a potential enhancement to the first image.

13. The program product according to claim 11, wherein the second interface further comprises the enhancement function key to affect a potential enhancement to the human object of the first image.

14. The program product according to claim 11, wherein the second interface comprises a prompt to save an alphanumeric characters content to an address book and the alphanumeric characters content displayed as an entry in the address book.

15. The program product according to claim 11, wherein the second interface comprises a High Dynamic Range (HDR) function key in response to the first image exceeding the brightness level.

\* \* \* \* \*